(12) United States Patent
Hirata et al.

(10) Patent No.: US 7,173,808 B2
(45) Date of Patent: Feb. 6, 2007

(54) SOLID ELECTROLYTIC CAPACITOR AND METHOD FOR MANUFACTURING THE SAME

(75) Inventors: Yoshikazu Hirata, Daito (JP); Koichi Morita, Hirakata (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 11/453,872

(22) Filed: Jun. 16, 2006

(65) Prior Publication Data

US 2006/0285277 A1    Dec. 21, 2006

(30) Foreign Application Priority Data

Jun. 20, 2005  (JP)  ............................. 2005-178985

(51) Int. Cl.
*H01G 4/228*  (2006.01)
*H01G 9/10*  (2006.01)

(52) U.S. Cl. ...................... 361/538; 361/540; 29/25.03

(58) Field of Classification Search ........ 361/528–529, 361/533, 535–538, 539–541
See application file for complete search history.

(56) References Cited

U.S. PATENT DOCUMENTS 5,781,401 A * 7/1998 Tomiyasu et al. .......... 361/303

6,665,172 B1 * 12/2003 Kim et al. .................. 361/523

FOREIGN PATENT DOCUMENTS

JP  10-64761  3/1998
JP  3157722  4/2001

* cited by examiner

*Primary Examiner*—Eric W. Thomas
(74) *Attorney, Agent, or Firm*—Armstrong, Kratz, Quintos, Hanson & Brocks, LLP

(57) ABSTRACT

A solid electrolytic capacitor (1) comprises an element (2) protruding an anode lead (20), an anode lead frame (3) to which the anode lead (20) is to be attached, and a housing (5) for covering the element (2). The anode lead frame (3) has a step portion (4). The step portion (4) comprises a first horizontal portion (40) provided inside a side portion of the housing (5), a second horizontal portion (41) provided higher or lower and further inside the housing (5) than the first horizontal portion (40) and receiving an outer surface of the anode lead (20), and a linking portion (42) linking the first horizontal portion (40) and the second horizontal portion (41). The linking portion (42) is provided with an open hole (43), an edge of the open hole (43) overlapping the second horizontal portion (41), and a tip portion of the anode lead (20) being fitted into the open hole (43).

4 Claims, 6 Drawing Sheets

SOLID ELECTROLYTIC CAPACITOR AND METHOD FOR MANUFACTURING THE SAME

BACKGROUND OF THE INVENTION

1. Field of the Invention

The present invention relates to a solid electrolytic capacitor comprising a lead frame, and a method for manufacturing the same.

2. Description of the Related Art

A solid electrolytic capacitor (1) having a configuration illustrated in FIG. 5 is known (see JP H10-64761A). The solid electrolytic capacitor (1) comprises a capacitor element (2) protruding a wire-like anode lead (20). An anode lead frame (3) is attached to the anode lead (20) by resistance welding. A cathode lead frame (30) is attached to an outer surface of the capacitor element (2) using a conductive adhesive (6). A part of the capacitor element (2) and both the lead frames (3) and (30) are covered with a housing (5) made of a synthetic resin. The lead frames (3) and (30) protruding outside the housing (5) are bent downward along an outer surface of the housing (5).

In the capacitor element (2), as illustrated in FIG. 6, a dielectric oxide coating (21), a solid electrolyte layer (22) formed of a conductive polymer, and a carbon and silver layer (23) are successively formed on a surface of an anode member (24) formed of a sintered valve metal, such as tantalum or the like, and the anode lead (20) protrudes from a center portion of the anode member (24).

Both the lead frames (3) and (30) with tip portions thereof in an extended position are initially attached to the anode lead (20) and the capacitor element (2), as illustrated in FIG. 7. The tip portions of both the lead frames (3) and (30) are positioned on substantially the same plane. After base end portions of both the lead frames (3) and (30) and the capacitor element (2) are covered with the housing (5), portions protruding from the housing (5) of both the lead frames (3) and (30) are angularly bent downward. In this case, bending stress during the bending process is applied to the base end portion of the anode lead (20) (B in FIG. 7). Although the base end portion is covered with the housing (5), the housing (5) is made of a synthetic resin and therefore is soft, so that the housing (5) has a small effect of relaxing force applied to the base end portion of the anode lead (20).

Therefore, when the bending stress is applied to the base end portion of the anode lead (20), the dielectric oxide coating (21) is damaged in the vicinity of the base end portion, likely leading to an increase in leakage current of the capacitor (1).

In addition, the solid electrolytic capacitor (1) of this type is often used in high frequency circuits, and there is a demand for a reduction in the Equivalent Series Resistance (ESR) of the solid electrolytic capacitor (1) so as to decrease the impedance of the whole circuit. It is considered that the ESR is reduced by increasing the diameter of the anode lead (20) to decrease the whole resistance of the anode lead (20).

However, if the diameter of the anode lead (20) is increased while the tip portions of both the lead frames (3) and (30) are positioned on substantially the same plane as illustrated in FIG. 7, a problem arises as illustrated in FIG. 8. Specifically, both the lead frames (3) and (30) are attached while the capacitor element (2) is tilted in an amount corresponding to an increase in the diameter of the anode lead (20). In this case, contact areas between the lead frames (3) and (30) and outer surfaces of the anode lead (20) and the capacitor element (2) are reduced, resulting in an increase in the ESR. If the capacitor element (2) is covered with the housing (5) in this situation, an excessively large load is applied to the capacitor element (2), leading to an increase in leakage current.

In view of this point, a configuration illustrated in FIG. 9 has been proposed (see Japanese Patent No. 3157722). In this configuration, an anode lead frame (3) is bent in a housing (5) to provide a step portion (4) which is lowered by a step. The step portion (4) includes a first horizontal portion (40), and a second horizontal portion (41) which is provided at an end of the first horizontal portion (40) and is positioned lower than the first horizontal portion (40). An anode lead (20) is welded onto a lower surface of the second horizontal portion (41). A part of bending stress of the anode lead frame (3) is received by the step portion (4), so that the bending stress applied to a base end portion of the anode lead (20) is relaxed. Thereby, the possibility that the leakage current of the capacitor (1) increases is reduced.

If the height of the second horizontal portion (41) is changed, depending on the diameter of the anode lead (20), the capacitor element (2) can be attached in an appropriate attitude even when the anode lead (20) is thick.

However, the conventional configuration has the following drawbacks.

Since the anode lead (20) is welded onto the lower surface of the second horizontal portion (41) which is angularly bent from the first horizontal portion (40), the contact area between the anode lead (20) and the anode lead frame (3) is reduced as compared to the configuration of FIG. 5. Particularly, as illustrated in an enlarged view in FIG. 10, an arc surface is formed at a portion where the step portion (4) is angularly bent as indicated with arrow C, and the anode lead (20) is not welded onto the arc surface, so that the contact area between the anode lead (20) and the anode lead frame (3) is further reduced, leading to an increase in the ESR. Also, the weld strength between the anode lead (20) and the anode lead frame (3) is reduced.

SUMMARY OF THE INVENTION

An object of the present invention is to provide a solid electrolytic capacitor which comprises an anode lead frame in which a step portion is formed, and despite this, can reduce the ESR.

A step portion of an anode lead frame comprises a first horizontal portion provided close to an end surface of a housing, a second horizontal portion provided higher or lower and further inside the housing than the first horizontal portion, and supporting an outer surface of the anode lead, and a linking portion linking the first horizontal portion and the second horizontal portion.

The linking portion is provided with an open hole, an edge of the open hole overlapping the second horizontal portion, and a tip portion of the anode lead being fitted into the open hole.

The anode lead is attached onto the surface of the second horizontal portion while the tip portion of the anode lead is fitted in the open hole. The open hole overlaps the second horizontal portion. Therefore, as illustrated in FIG. 3A, the anode lead is attached to the second horizontal portion along a length from a tip of the second horizontal portion to the edge of the open hole. Specifically, a length and an area of a junction portion between the anode lead and the anode lead frame can be increased as compared to the configuration of FIG. 10 in which an arc surface C to which the anode lead cannot be attached is formed. Thereby, the ESR can be reduced.

DESCRIPTION OF THE PREFERRED EMBODIMENTS

Figure 6:
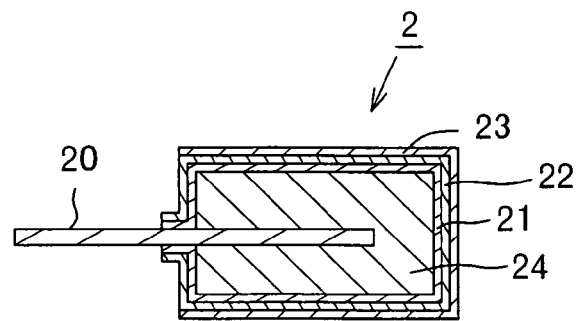
FIG. 6 is a cross-sectional view of a capacitor element.
Figure 7:
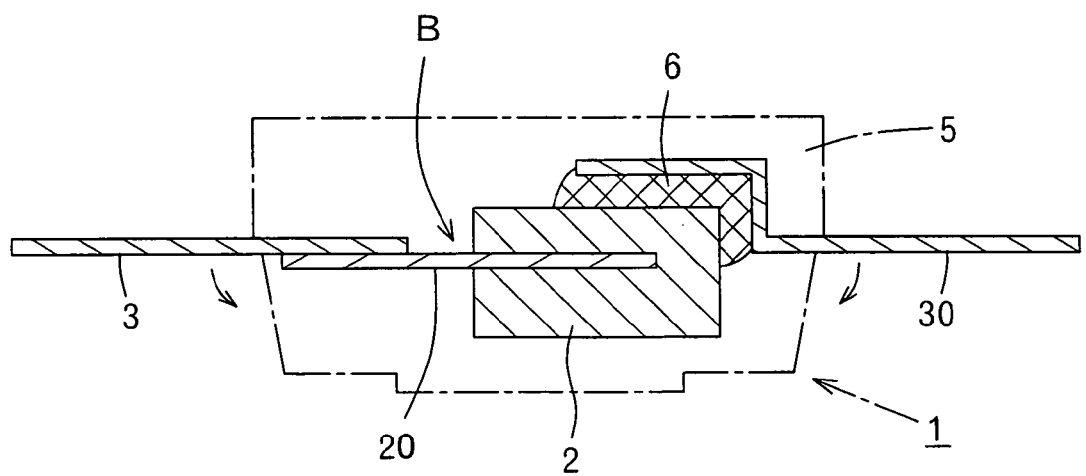
FIG. 7 is a cross-sectional view for illustrating steps of manufacturing a conventional solid electrolytic capacitor.
Figure 8:
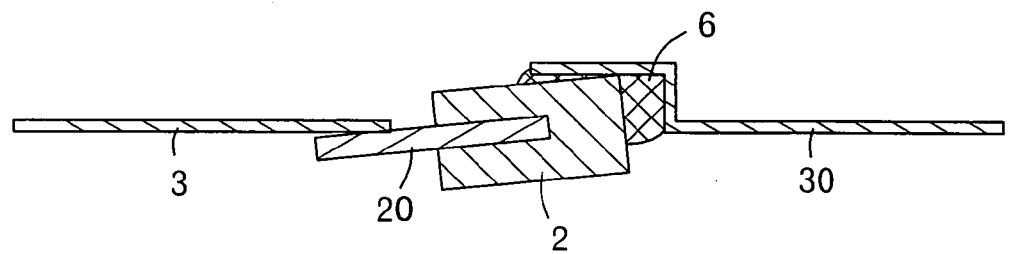
FIG. 8 is a cross-sectional view for illustrating a state in which a capacitor element is attached to an anode lead frame while the capacitor element is tilted.
Figure 9:
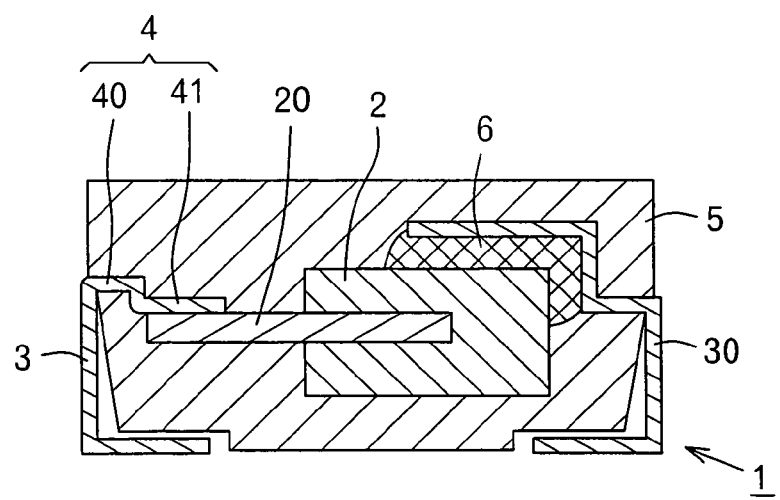
FIG. 9 is a cross-sectional view of another conventional solid electrolytic capacitor.

Hereinafter, an example of the present invention will be described in detail with reference to the accompanying drawings. A capacitor element (2) used in a solid electrolytic capacitor (1) of this example has the same structure as the conventional structure of FIG. 6. Here, a solid electrolyte layer (22) of the capacitor element (2) is formed of polypyrrole, or alternatively, for example, a conductive polymer (e.g., polythiophene, polyaniline, polyfuran, etc.), TCNQ (7, 7, 8, 8-tetraacynoquinodimethane) complex salt, or the like. Lead frames (3) and (30) are formed of, for example, a copper-containing alloy, an iron-nickel alloy, or the like.

An anode member (24) is formed of a valve metal, such as tantalum, niobium, titanium, aluminum, or the like.

A wire-like anode lead (20) protrudes from the capacitor element (2). The anode lead frame (3) is attached to the anode lead (20) by resistance welding. The cathode lead frame (30) is attached to an outer surface of the capacitor element (2) using a conductive adhesive (6). A part of the capacitor element (2) and both the lead frames (3) and (30) is covered with a housing (5) made of a synthetic resin. The lead frames (3) and (30) protruding outside the housing (5) are bent downward along an outer surface of the housing (5).

A base end portion of the anode lead frame (3) has a step portion (4) which is inwardly raised by a step in the housing (5).

Figure 1:
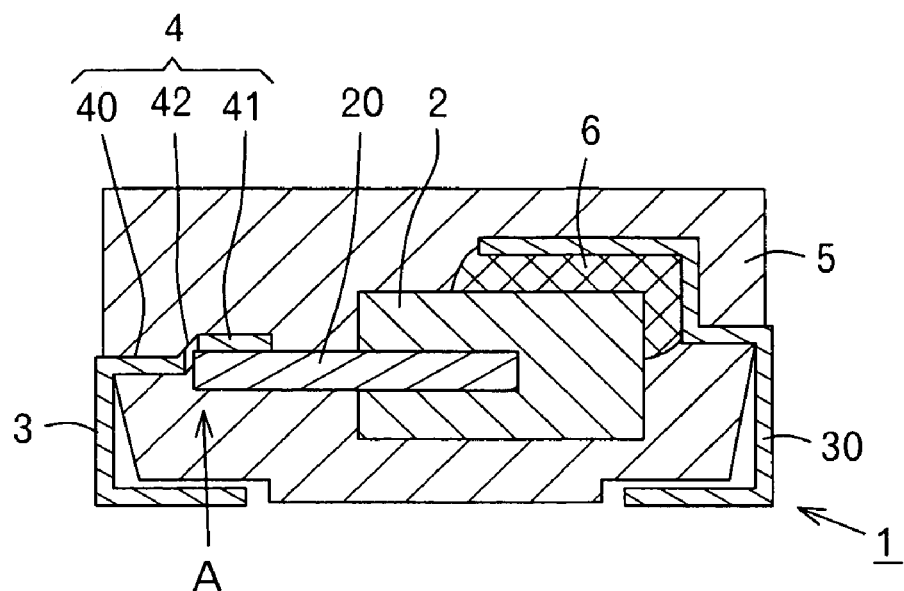
FIG. 1 a cross-sectional, front view of a solid electrolytic capacitor.
Figure 2:
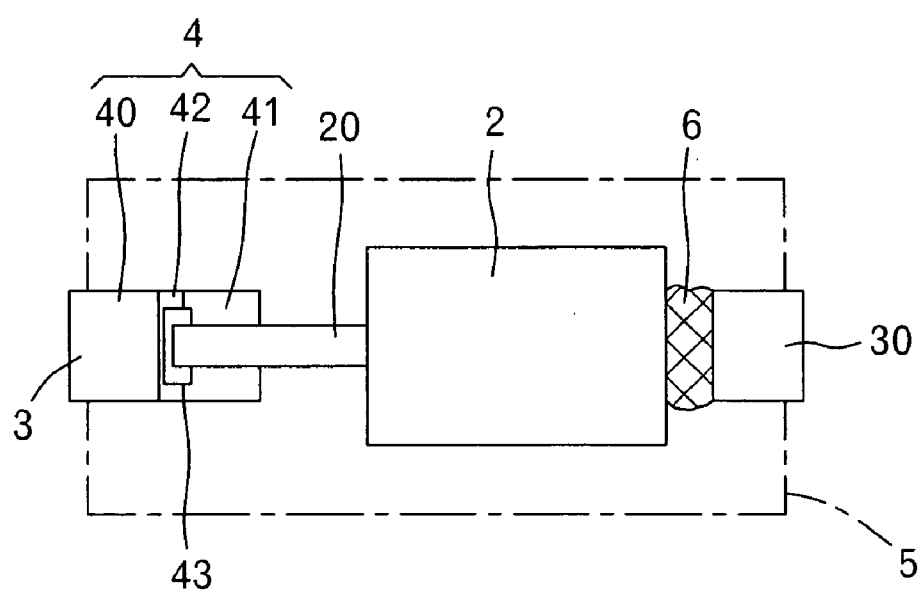
FIG. 2 is a bottom view of the solid electrolytic capacitor of FIG. 1 as viewed in the direction A.
Figure 3A:
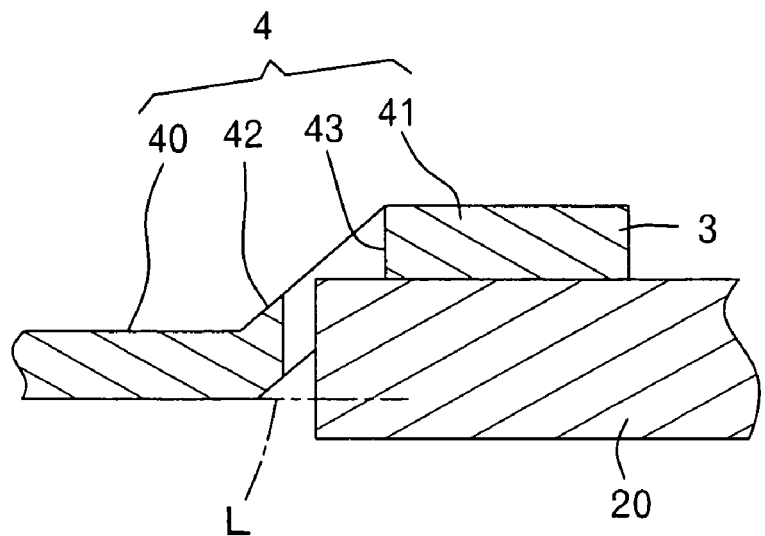
FIG. 3A is an enlarged view of a step portion of FIG. 1.

As illustrated in FIGS. 1 and 3A, the step portion (4) comprises a first horizontal portion (40) provided close to an end surface of the housing (5), a second horizontal portion (41) provided higher and further inside housing (5) than the first horizontal portion (40), and a linking portion (42) which links the first horizontal portion (40) with the second horizontal portion (41) and faces a tip of the anode lead (20). The second horizontal portion (41) is attached to the anode lead (20) by resistance welding and receives an outer surface of the anode lead (20).

While the outer surface of the capacitor element (2) contacts the cathode lead frame (30), the second horizontal portion (41) is substantially parallel to the anode lead (20), and the capacitor element (2) is placed horizontally, bridging both the lead frames (3) and (30).

The linking portion (42) is inclined with respect to the second horizontal portion (41), and is provided with an open hole (43) into which a part of the tip portion of the anode lead (20) is fitted. In FIG. 3A, a right edge of the open hole (43) overlaps the second horizontal portion (41), i.e., is located at a left end of the second horizontal portion (41). Thereby, the anode lead (20) is attached to the second horizontal portion (41) without floating from the second horizontal portion (41).

A phantom plane L extending from a surface of the first horizontal portion (40) continuing to a surface of the second horizontal portion (41) contacting the anode lead (20) traverses the anode lead (20).

Figure 3B:
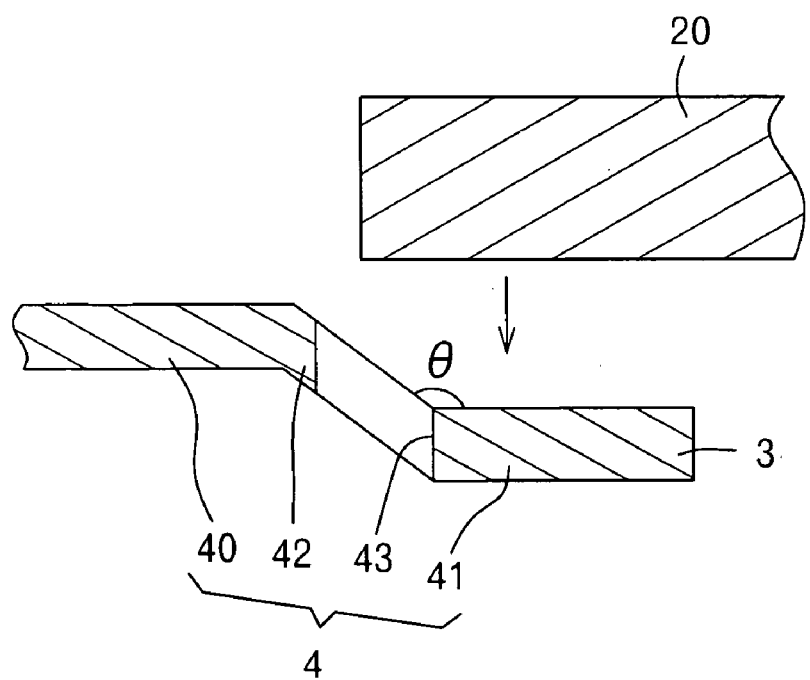
FIG. 3B is enlarged view for explaining an assembly step where the structure of FIG. 3A is turned upside down.

When the capacitor element (2) is attached to the anode lead frame (3), the anode lead frame (3) is turned upside down, and the capacitor element (2) is lowered from over the anode lead frame (3) so that the anode lead (20) is placed on the second horizontal portion (41), as illustrated in FIG. 3B. In this case, the left end portion of the anode lead (20) is fitted into the open hole (43) and is supported by the second horizontal portion (41). After the anode lead (20) is welded with the second horizontal portion (41) by resistance welding, the resultant structure is turned over from the state of FIG. 3B to the state of FIG. 3A.

Thereafter, a part of the capacitor element (2) and the lead frames (3) and (30) is covered with the housing (5), and the lead frames (3) and (30) are angularly bent along an outer surface of the housing (5), thereby obtaining the solid electrolytic capacitor (1) of FIG. 1.

Figure 10:
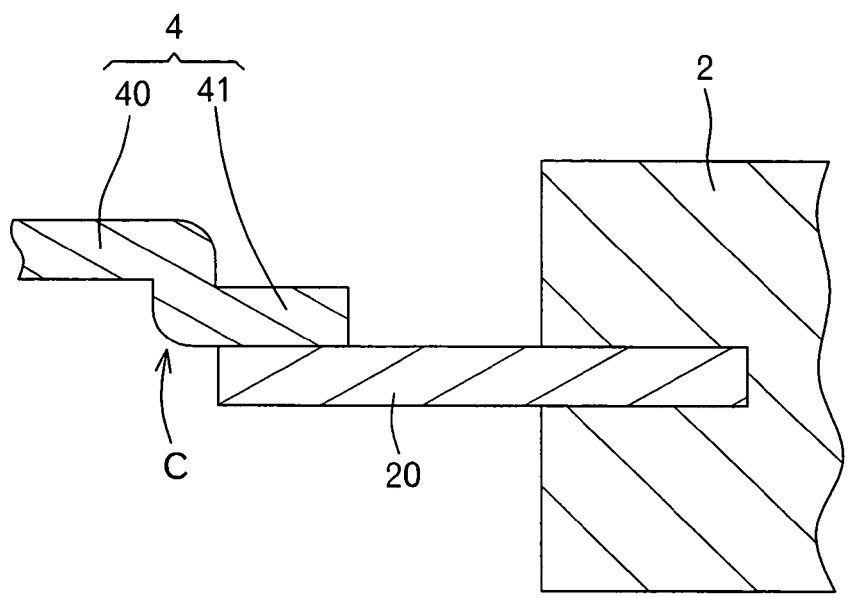
FIG. 10 is an enlarged view of a step portion of the solid electrolytic capacitor of FIG. 9.

Since the edge of the open hole (43) overlaps the second horizontal portion (41), the anode lead (20) is attached to the second horizontal portion (41) along a length from a tip of the second horizontal portion (41) to the edge of the open hole (43). Specifically, a length and an area of a junction portion between the anode lead (20) and the anode lead frame (3) can be increased as compared to the configuration of FIG. 10 in which the arc surface C to which the anode lead (20) cannot be attached is formed. Thereby, the ESR can be reduced.

Figure 4:
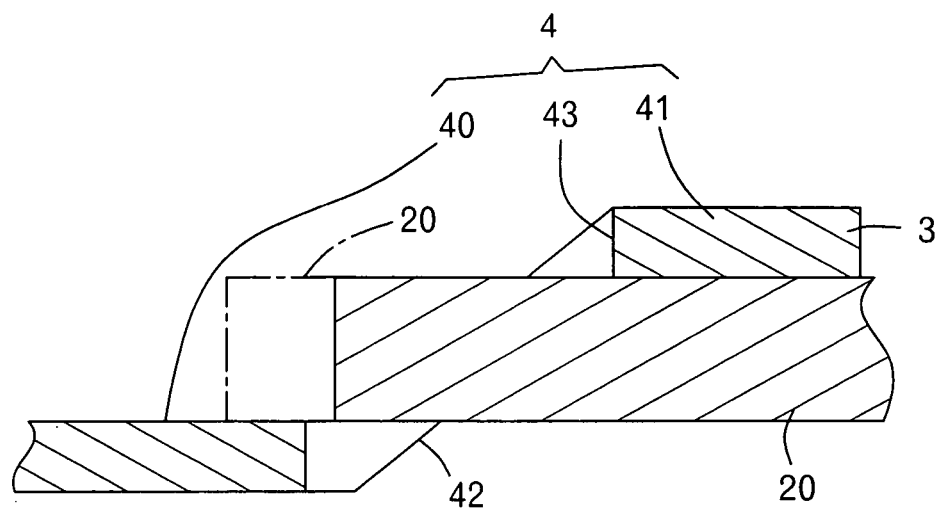
FIG. 4 is an enlarged view of another exemplary step portion.
Figure 5:
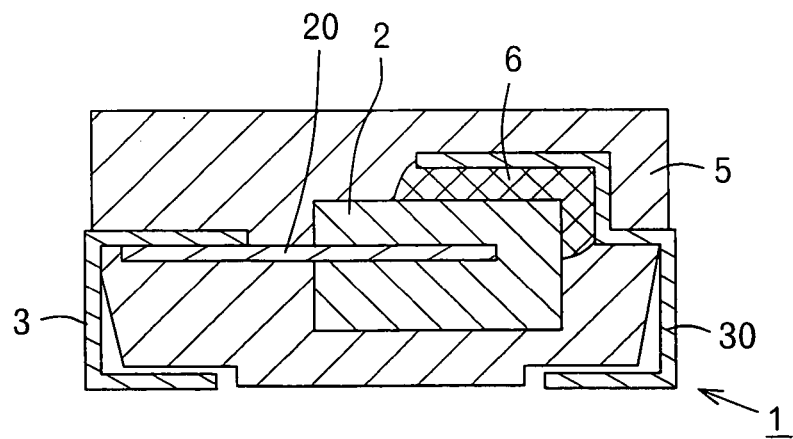
FIG. 5 is a cross-sectional view of a conventional solid electrolytic capacitor.

In the above-described example, the open hole (43) is provided in the linking portion (42). Alternatively, as illustrated in FIG. 4, the open hole (43) may straddle a border between the linking portion (42) and the first horizontal portion (40). Specifically, although a part of the tip portion of the anode lead (20) is fitted into the open hole (43) in FIG. 3A (i.e., the end surface of the tip portion of the anode lead (20) strikes an edge of the open hole (43) and does not go further), the open hole (43) may have a size which allows the whole diameter of the anode lead (20) to be fitted into the open hole (43) as illustrated in FIG. 4. Alternatively, as indicated with a dash-dot line in FIG. 4, the tip portion of the anode lead (20) may overlap the first horizontal portion (40).

In the example of FIG. 3A, the linking portion (42) has a length shorter than that indicated in FIG. 4. Therefore, if the sum of lengths of the linking portion (42) and the second horizontal portion (41) is the same, the second horizontal portion (41) can be caused to be longer in the configuration of FIG. 3A than in that of FIG. 4. In other words, the length and area of the junction portion between the anode lead (20) and the second horizontal portion (41) can be caused to be larger in the configuration of FIG. 3A, thereby making it possible to further reduce the ESR.

The applicant herein assumes that an angle θ between the linking portion (42) and the second horizontal portion (41) (see FIG. 3B) is an obtuse angle of 100 degrees or more. The present invention is not limited to this angle. It is also herein assumed that the anode lead (20) has a diameter of 0.4 mm or more. The present invention is not limited to this diameter dimension.

Also in the above description, it is assumed that, when the capacitor element (2) is attached to the anode lead frame (3), the capacitor element (2) is provided over the anode lead frame (3) and thereafter is lowered. Instead of this, the capacitor element (2) may be provided under the anode lead frame (3) and thereafter may be lifted.

Figure 11:
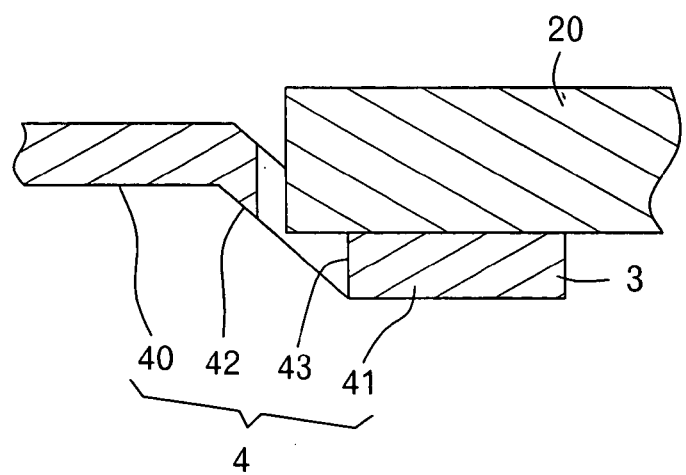
FIG. 11 is an enlarged view of another exemplary step portion.

In addition, as illustrated in FIG. 11, the second horizontal portion (41) may be positioned lower and further inside the housing (5) than the first horizontal portion (40).

What is claimed is:

1. A solid electrolytic capacitor comprising:
   a capacitor element protruding an anode lead;
   an anode lead frame to which the anode lead is to be attached; and
   a housing for covering the capacitor element,
   wherein the anode lead frame has a step portion in the housing,
   the step portion comprises a first horizontal portion provided close to an end surface of the housing, a second horizontal portion provided higher or lower and further inside the housing than the first horizontal portion and receiving an outer surface of the anode lead, and a linking portion linking the first horizontal portion and the second horizontal portion, and
   the linking portion is provided with an open hole, an edge of the open hole continuing to the second horizontal portion, and a tip portion of the anode lead being fitted into the open hole.

2. The solid electrolytic capacitor according to claim 1, wherein a phantom plane extending from a surface of the first horizontal portion continuing to a surface of the second horizontal portion contacting the anode lead, traverses the anode lead.

3. The solid electrolytic capacitor according to claim 1, further comprising a cathode lead frame attached to an outer surface of the capacitor element, wherein the second horizontal portion is disposed substantially parallel to the anode lead when the outer surface of the capacitor element contacts the cathode lead frame.

4. A method for manufacturing a solid electrolytic capacitor, wherein
   the solid electrolytic capacitor comprises an capacitor element protruding an anode lead, an anode lead frame to which the anode lead is to be attached, and a housing for covering the element,
   the anode lead frame has a step portion in the housing,
   the step portion comprises a first horizontal portion provided close to an end surface of the housing, a second horizontal portion provided higher or lower and further inside the housing than the first horizontal portion and receiving an outer surface of the anode lead, and a linking portion linking the first horizontal portion and the second horizontal portion, and
   the linking portion is provided with an open hole, an edge of the open hole overlapping the second horizontal portion, and a tip portion of the anode lead being fitted into the open hole,
   the method comprises the steps of:
      opposing the anode lead of the element over or under the second horizontal portion;
      moving the anode lead upward or downward to fit the tip portion of the anode lead into the open hole so that the anode lead is attached to the second horizontal portion; and
      covering the element and the lead frames with the housing.

* * * * *